(12) United States Patent
Pelletier et al.

(10) Patent No.: US 8,437,257 B2
(45) Date of Patent: May 7, 2013

(54) BUFFER STATUS REPORTING BASED ON RADIO BEARER CONFIGURATION

(75) Inventors: Ghyslain Pelletier, Boden (SE);
Magnus Lindström, Spånga (SE);
Janne Peisa, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 402 days.

(21) Appl. No.: 12/740,846

(22) PCT Filed: Oct. 30, 2008

(86) PCT No.: PCT/SE2008/051234
§ 371 (c)(1),
(2), (4) Date: Apr. 30, 2010

(87) PCT Pub. No.: WO2009/058086
PCT Pub. Date: May 7, 2009

(65) Prior Publication Data
US 2010/0329135 A1    Dec. 30, 2010

Related U.S. Application Data

(60) Provisional application No. 60/984,454, filed on Nov. 1, 2007.

(51) Int. Cl.
*H04J 3/14* (2006.01)
(52) U.S. Cl.
USPC ............................................. 370/235

(58) Field of Classification Search .......... 370/310–349, 370/229–236
See application file for complete search history.

(56) References Cited

U.S. PATENT DOCUMENTS

| | | | |
|---|---|---|---|
| 7,006,472 B1 * | 2/2006 | Immonen et al. | 370/332 |
| 7,974,312 B2 * | 7/2011 | Ahmadi et al. | 370/477 |
| 2004/0125793 A1 * | 7/2004 | Yi et al. | 370/352 |
| 2005/0201353 A1 * | 9/2005 | Lee et al. | 370/349 |
| 2005/0287957 A1 | 12/2005 | Lee et al. | |
| 2007/0201369 A1 | 8/2007 | Pedersen et al. | |
| 2009/0052420 A1 * | 2/2009 | Fischer | 370/338 |

FOREIGN PATENT DOCUMENTS

| | | |
|---|---|---|
| EP | 1 511 245 A | 3/2005 |
| EP | 1 599 063 A | 11/2005 |
| WO | WO 2005/112489 A1 | 11/2005 |

OTHER PUBLICATIONS

U.S. Appl. No. 60/955,382; Fischer, "LTE System", Aug. 12, 2007.*

(Continued)

*Primary Examiner* — Jeffrey M Rutkowski
*Assistant Examiner* — Juvena Loo (57) ABSTRACT

The present invention relates to wireless communication systems, and more particularly to a method and an apparatus for periodically reporting the buffer status in a wireless communication system. Methods and arrangements for an improved buffer status reporting taking the type of radio bearer configuration into account is provided. This is achieved according to an embodiment of the present invention by taking the type of radio bearer configuration into account when determining the content of the buffer status report sent by the UE to the eNodeB.

20 Claims, 8 Drawing Sheets

OTHER PUBLICATIONS

"Universal Mobile Telecommunications System (UMTS): Evolved Universal Terrestrial Radio Access (E-UTRA) and Evolved Universal Terrestrial Radio Access (E-UTRAN); Overall description; Stage 2 (3GPP TS 36.300 version 8.2.0 Release 8); ETSI TS 136 300" ETSI Standards, LIS, Sophia Antipolis Cedex, France, vol. 3-R2, No. V8.2. 0, Oct. 1, 2007, XP014040285 ISSN: 0000-0001.

Motorola. "Comparison of UL buffer reporting/scheduling schemes in LTE" 3GPP DRAFT; R2-061915, 3rd Generation Partnership Project (3GPP), Mobile Competence Centre; 650, Route Des Lucioles; F-06921 Sophia-Antipolis CEDEX; France, vol. tsg_ran\WG2_RL2\TSGR2_AHs\ 2006_06_LTE\Docs . no. Cannes, France; 20060627, Jun. 21, 2006, XP050141948.

ITRI: IIBuffer Status Reporting with Group Combining for L TEII 3GPP DRAFT; R2-072833, 3rd Generation Partnership Project (3GPP), Mobile Competence Centre; 650, Route Des Lucioles; F-06921 Sophia-Antipolis CEDEX ; France, tsg_ran\WG2_RL2\ TSGR2_5Sbis\Docs, Orlando, USA; 20070625, Jun. 25, 2007, XP050135610.

* cited by examiner

BUFFER STATUS REPORTING BASED ON RADIO BEARER CONFIGURATION

This application claims the benefit of U.S. Provisional Application No. 60/984,454, filed Nov. 1, 2007, the disclosure of which is fully incorporated herein by reference.

TECHNICAL FIELD

The present invention relates to wireless communication systems, and more particularly to a method and an apparatus for periodically reporting the buffer status in a wireless communication system.

BACKGROUND

UTRAN (Universal Terrestrial Radio Access Network) is a term that identifies the radio access network of a UMTS (Universal Mobile Telecommunications System), wherein the UTRAN consists of Radio Network Controllers (RNCs) and NodeBs i.e. radio base stations. The NodeBs communicate wirelessly with mobile user equipments and the RNCs control the NodeBs. The RNCs are further connected to the Core Network (CN). Evolved UTRAN (E-UTRAN) is an evolution of the UTRAN towards a high-data rate, low-latency and packet-optimised radio access network. Further, the E-UTRAN consist of eNodeBs (evolved eNodeBs), and the eNodeBs are interconnected and further connected to the Evolved Packet Core network (EPC). E-UTRAN is also being referred to as Long Term Evolution (LTE) and is standardized within the $3^{rd}$ Generation Partnership Project (3GPP).

In LTE, an uplink Media Access Control (MAC) scheduler resides in the eNodeB and assigns transmission resources to user equipments in the cell. Furthermore, the eNodeB selects the Transport Format (TF) to be used by the user equipment. In order to perform these tasks the MAC scheduler needs information about the UEs current buffer states, i.e. if and how much data the UE buffers in its priority queues. The MAC scheduler may also need further information such as the available power headroom and the transmit power used to estimate uplink gain to select a suitable TF. Very precise and up-to-date scheduling information allows accurate scheduling decisions. However, providing this information from the UE towards the eNodeB comes at a certain cost which must be compared to the gain it offers.

A detailed buffer status report may be quite large in number of bits and if transmitted frequently would cost considerable overhead. For many applications the buffer status is continuously changing. For example, Transmission Control Protocol (TCP) continuously increases its congestion window but when experiencing a packet drop it decreases the congestion window. For the applications utilizing the TCP a rough buffer indication that is frequently updated is more useful.

Buffer status reporting is being standardized in 3GPP. Buffer status reporting is performed by the UE to report to the eNodeB the amount of data available for transmission stored in its buffer. The eNodeB utilizes the buffer status reports to allocate resources to the UE and to prioritize resource allocation between the UEs in a cell.

Figure 1:
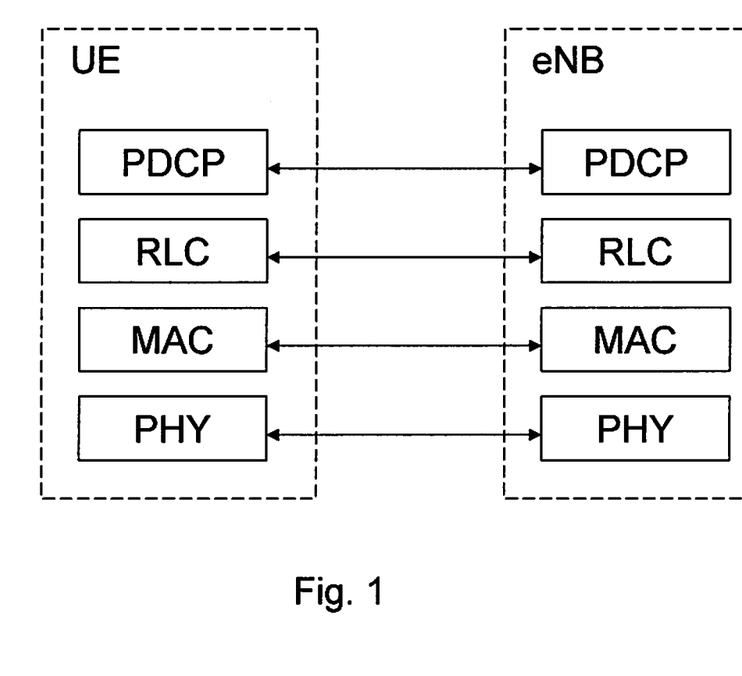
FIG. 1 shows the protocol stack for the user plane in LTE according to prior art.
Figure 2:
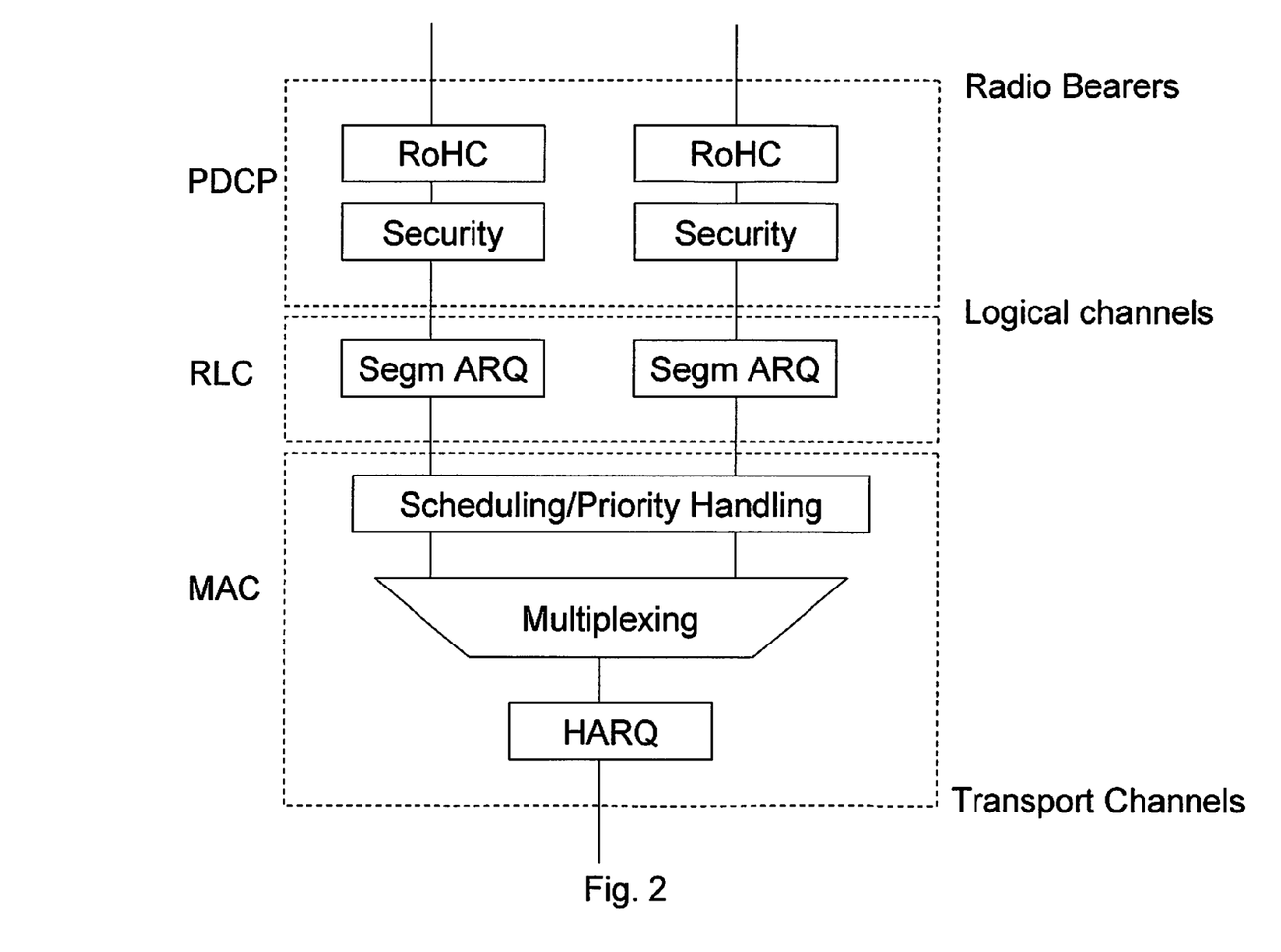
FIG. 2 shows the layer 2 structure for uplink in LTE according to prior art.
Figure 3:
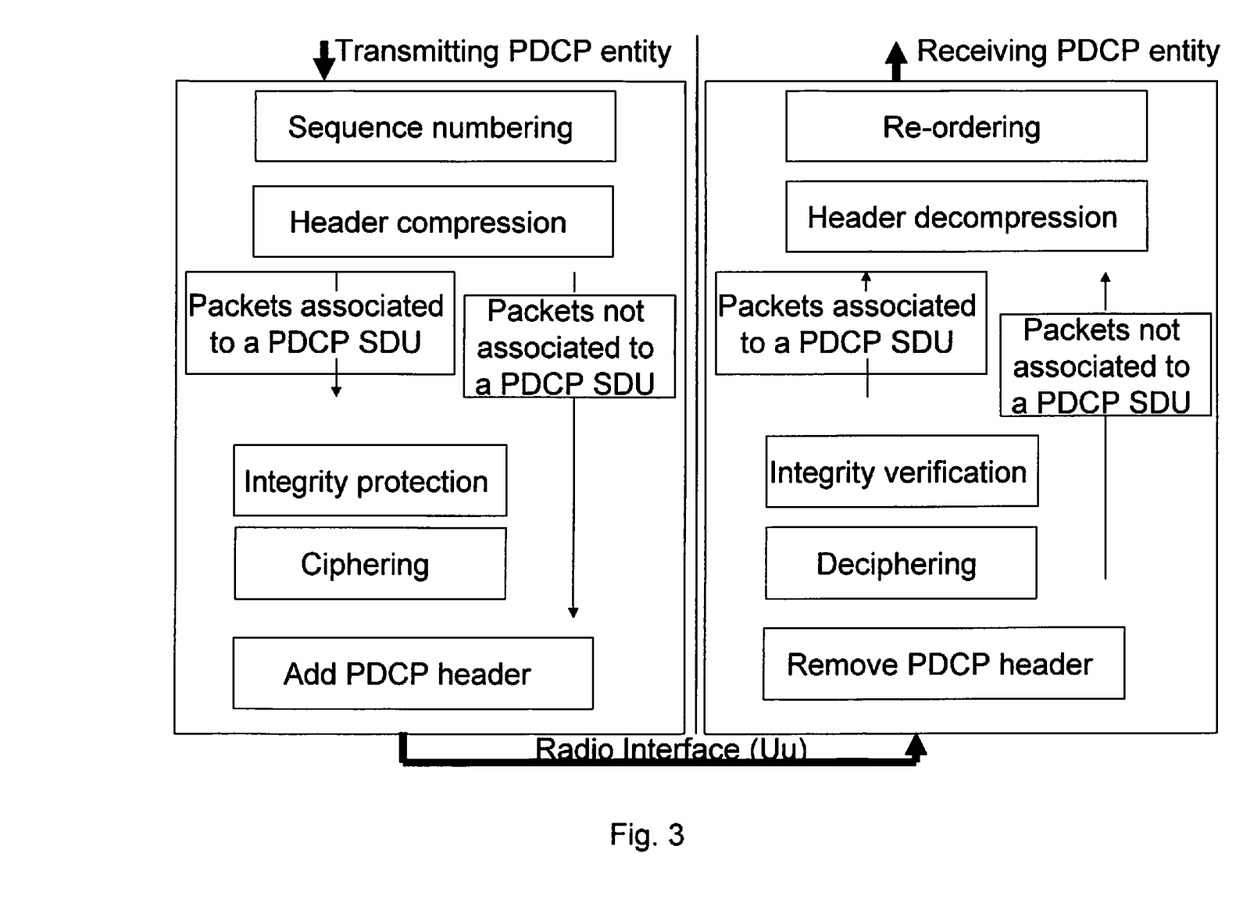
FIG. 3 illustrates the header compression, the reordering functions and the ciphering functions hosted by PDCP layer in LTE according to prior art.

LTE is compatible with the OSI layered reference model for both the UE part and the E-UTRAN part. The protocol architecture is subdivided into the control plane, responsible for the transmission of signaling information, and the user plane, responsible for the transmission of user data. FIG. 1 shows the protocol stack for the user plane in LTE. In particular, three protocol layers are considered: the Physical Layer (layer 1), the Data Link Layer (layer 2) and the Network Layer (layer 3). The layer 2 protocols include the Media Access Control (MAC) protocol, the Radio Link Control (RLC) protocol, and the Packet Data Convergence Protocol (PDCP). The layer 2 structure for uplink is shown in FIG. 2. The MAC performs buffer status reporting. The RLC provides radio link management for the radio interface. The PDCP hosts the header compression, the reordering functions and the ciphering functions as illustrated in FIG. 3.

As stated in the 3GPP standardization document TS 36.323, the LTE supports compression of Internet Protocol (IP) headers in the PDCP. The header compression protocol is based on the Robust Header Compression (RoHC) framework, RFC 4995. RoHC compresses 40 bytes or 60 bytes of overhead typically into only 1 or 3 bytes by placing a compressor before the link that has limited capacity and a decompressor after that link. The compressor converts the large overhead to only a few bytes, while the decompressor does the opposite.

There are multiple header compression algorithms, called profiles, defined in the RoHC framework. Each profile is specific to the particular network layer, transport layer or upper layer protocol combinations e.g. TCP/IP and RTP/UDP/IP (Real-time Transport Protocol/User Datagram Protocol/IP).

However, the compression ratio achieved by the header compression algorithm depends on a number of factors, including:
  the change behaviour of the data fields in a sequence of packets from one packet to the other e.g. the IP Identifier behaviour, or the typical inter-packet increase in sequence numbers and timestamps,
  the state of the compression context,
  possible impairment over the link carrying the compressed packets, e.g. losses, reordering, feedback requesting context repairs, and
  implementation-specific factors, such as robustness algorithms, e.g. the number of repetition of the same type of update, feedback logic, and the subset of compressed headers supported etc.

Because of these factors, the compression ratio that is possible to achieve cannot be determined ahead of the compression process itself for one specific packet. Thus, the exact amount of bits that needs to be transmitted between the UE and the eNodeB is known only after header compression has been performed.

Furthermore, the RLC can be configured to operate in different modes, e.g. Transparent Mode (TM), Unacknowledged Mode (UM) and Acknowledged Mode (AM). RLC-TM functions include the transfer of user data. RLC-UM functions include the transfer of user data, segmentation and reassembly functionalities and sequencing. The RLC-AM provides reliability through retransmission. RLC-AM functions include transfer of user data, segmentation and reassembly functionalities, error correction, duplicate detection, protocol error detection and recovery. The RLC-AM includes an Automatic Repeat Request (ARQ) function that provides error correction for services requiring higher transmission reliability, such as packet-switched data services. However, in RLC-UM mode the RLC does not perform ARQ and consequently some RLC SDUs (Service Data Units) may be lost.

When a UE performs a handover from one cell to another, e.g. intra-eNodeB handover or inter-eNodeB handover, for radio bearers configured with RLC-AM, the UE cumulatively retransmits all PDCP SDUs starting from the sequence number corresponding to the oldest PDU that has not been acknowledged by RLC prior to the handover indication. A radio bearer that is configured with RLC-AM can also be configured to use a PDCP status report. The PDCP status report is used at handover for the PDCP SDUs that where not successfully received before the handover; this can be used by the receiver of the report to avoid sending duplicates to the target eNodeB after the handover.

Furthermore, at handover both ciphering and header compression are restarted. Thus, in order to transmit PDCP SDUs in the target cell, a new security context and a new header compression context must be used. Consequently, as both security and header compression are restarted, any data buffered in the RLC layer become useless and is thus discarded. If data available for transmission is buffered below the PDCP layer, i.e. header compression and ciphering have both been performed on the buffered data, the UE must still have the means to access the uncompressed and unciphered data in order to compress and cipher the data based on the new respective contexts at handover. Otherwise, the data is lost when the RLC buffers are cleared. On the other hand, if data available for transmission is buffered above the PDCP layer header compression and ciphering have not yet been performed on the buffered data. In the case when header compression is configured, the UE can only report the uncompressed amount of data buffered in its buffer and the buffer reporting is thus not accurate. It should be noted that the UE normally processes data only in the TTI (Transmission Time Interval), in which the data is sent. Thus, data may be buffered below the PDCP layer and above the PDCP layer.

Moreover, active queue management (AQM) can be performed to drop packets from the queue when the amount of data being buffered for transmission exceeds the capacity of the UE to store and transmit the data. It is normally preferable to perform AQM before the PDCP layer for IP flows with a higher packet rate in order not to negatively impact the PDCP functions, e.g. to avoid loss of security/header compression synchronization.

In the state of the art buffer status reporting mechanism the UE always report either:
  1) the size of uncompressed data,
  2) a size of data that approximates the size of the compressed data, based on an estimation of the compression ratio, or
  3) the size of compressed data.

However, in case of 1), i.e. the size of uncompressed data is reported when header compression is configured, the reported size of data will not be accurate as explained previously. In case of 2), i.e. the size of data that approximates the size of the compressed data is reported, the reporting will be inaccurate because the compression ratio is not deterministic and cannot be predicted accurately. Additionally, in order to perform the estimation it introduces complexity. In case of 3), i.e. the size of compressed data is reported, it is implied that either a UE performs header compression of all data as soon as the data arrives in the PDCP layer, or it cannot produce a report for some of the data. It is expected that the UE will process data, e.g. perform header compression and ciphering, only at the time of transmission in order to take into account any change in the compression state i.e. changes due to timers or feedback, and to minimize memory requirements. The UE must maintain an uncompressed copy of the compressed PDCP SDU in some cases, e.g. when RLC AM is configured, as otherwise some data might be lost when the RLC buffers are reset for example when handover is executed.

As mentioned previously, the eNodeB uses the buffer status report received from the UE to allocate radio resources to the UE to meet service requirements, to avoid UE buffer overflowing as well as stop allocating resources to the UE when the UE has no more data to transmit. Without buffer status reports, or with inaccurate buffer status reporting wherein the size of reported data in the UE buffers is larger than what will actually be transmitted, the eNodeB will allocate more resources than needed by the UE and lead to that the UE transmits padding for the grants already issued to the UE. In case the size of the reported data in the UE buffers is smaller than what is actually transmitted, the eNodeB will allocate too little resources which will lead to segmentation and increased transmission delays.

How significant the error in the buffer status reporting is depends on the size of the IP payload with respect to the size of the uncompressed header. If the UE always reports the status of its buffer based on the uncompressed size of data and header compression is configured, the reported size of data will be entirely inaccurate. For data services where the size of the payload in the IP packet is small and comparable to the size of the uncompressed header, e.g. Voice over IP, pure TCP acknowledgements, then the error will be quite important, e.g. roughly 50% for Voice over IP/AMR12.2 with RoHC compression, otherwise the error may be less significant.

SUMMARY

As stated above, the UE buffer status reporting in the prior art solution could deviate significantly from the actual size of data the UE has to transmit to the eNodeB. Furthermore, if the UE would be mandated to perform header compression as soon as data has become available for transmission for the purpose of improving accuracy of the buffer status report, the memory requirement of the UE would increase as the UE has to maintain duplicate of the data in case of a change of security and header compression context. Therefore, the aim of the present invention is to provide methods and arrangements for an improved buffer status reporting.

The aim is achieved according to the present invention by taking the type of radio bearer configuration into account when determining the content of the buffer status report sent by the UE to the eNodeB.

In accordance with a first aspect of the present invention a method for a user equipment of a wireless communication system for reporting a buffer status to a network node of the wireless communication system is provided. The user equipment comprises a data buffer associated with a radio bearer and data available for transmission in the data buffer to be transmitted to the network node is determined. Moreover, a configuration of the radio bearer is determined. Further a buffer size based on at least one of the data available for transmission and the configuration of the radio bearer is determined. The buffer status comprising the buffer size is reported to the network node.

In accordance with a second aspect of the present invention a user equipment adapted for reporting a buffer status to a network node is provided. The user equipment and the network node are comprised in a wireless communication system and the user equipment comprises a data buffer associated with a radio bearer. The user equipment comprises means for determining data available for transmission in the data buffer to be transmitted to the network node. Furthermore, the user equipment comprises means for determining a configuration of the radio bearer and means for determining a buffer size based on at least one of the data in the data buffer and the configuration of the radio bearer. Further, the user equipment comprises a transmitter for reporting the buffer status comprising the buffer size to the network node.

An advantage of the present invention is that it provides a more accurate UE buffer status reporting. The buffer status reporting does not significantly deviate from the actual size of data the UE has to transmit to the eNodeB. This implies a more efficient radio resource allocation performed by the eNodeB.

Another advantage is that it does not put additional requirements on memory storage in the UE, as it does not require the UE to compress all data in its buffer in order to provide a more accurate reporting, since the UE normally has to maintain duplicate of a data, in case of a change in security and header compression context.

Yet another advantage is that header compression and ciphering can be performed outside the time-critical processing path.

BRIEF DESCRIPTION OF THE DRAWINGS

For a better understanding, reference is made to the following drawings and preferred embodiments of the invention.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practiced in other embodiments that depart from these specific details. Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As stated above the UE buffer status reporting in the prior art solution could deviate significantly from the actual size of data the UE has to transmit to the eNodeB. Furthermore, the UE has to maintain duplicate of the data in case of a change of security and header compression context. Thus, the present invention provides methods and arrangements for an improved buffer status reporting taking the type of radio bearer configuration into account when reporting the buffer status report. This is achieved according to an embodiment of the present invention by taking the type of radio bearer configuration into account when determining the content of the buffer status report sent by the UE to the eNodeB.

Figure 4:
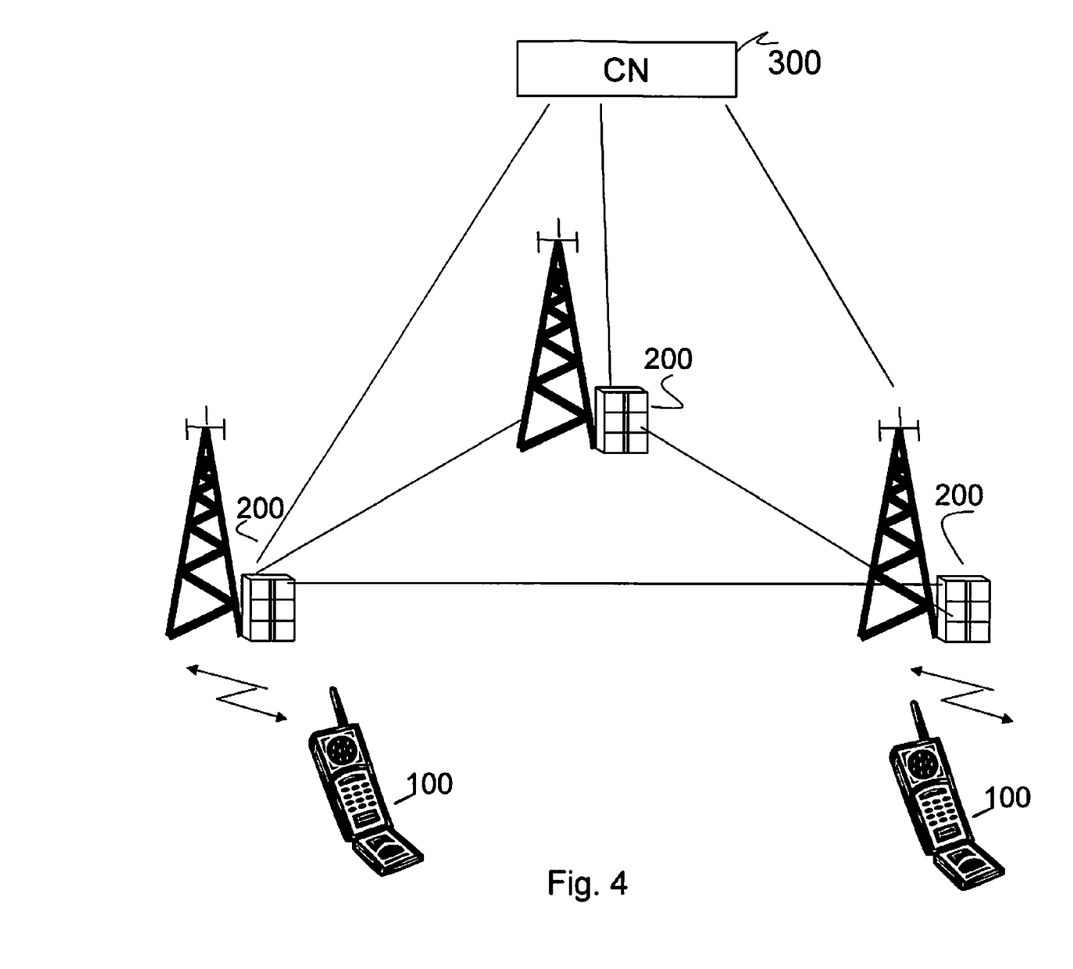
FIG. 4 illustrates schematically a wireless communication network wherein the present invention may be implemented according to prior art.

FIG. 4 illustrates schematically a wireless communication network wherein the present invention may be implemented. The communication network is widely deployed to provide a variety of communication services such as voice and packet data. As illustrated in FIG. 4, the wireless communication network may include one or more eNodeBs 200 connected to a core network 300, and a plurality of UEs 100 may be located in one cell. A radio link may be defined as a logical channel between the UE 100 and the eNodeB 200. Its physical realization comprises radio bearer transmissions. The uplink buffer status reports comprises information of the data available for transmission that is buffered in the logical channel queues in the UE.

We now turn to FIGS. 5-8 which show flowcharts of the methods and a block diagram of the arrangement according to embodiments of the present invention.

Figure 5:
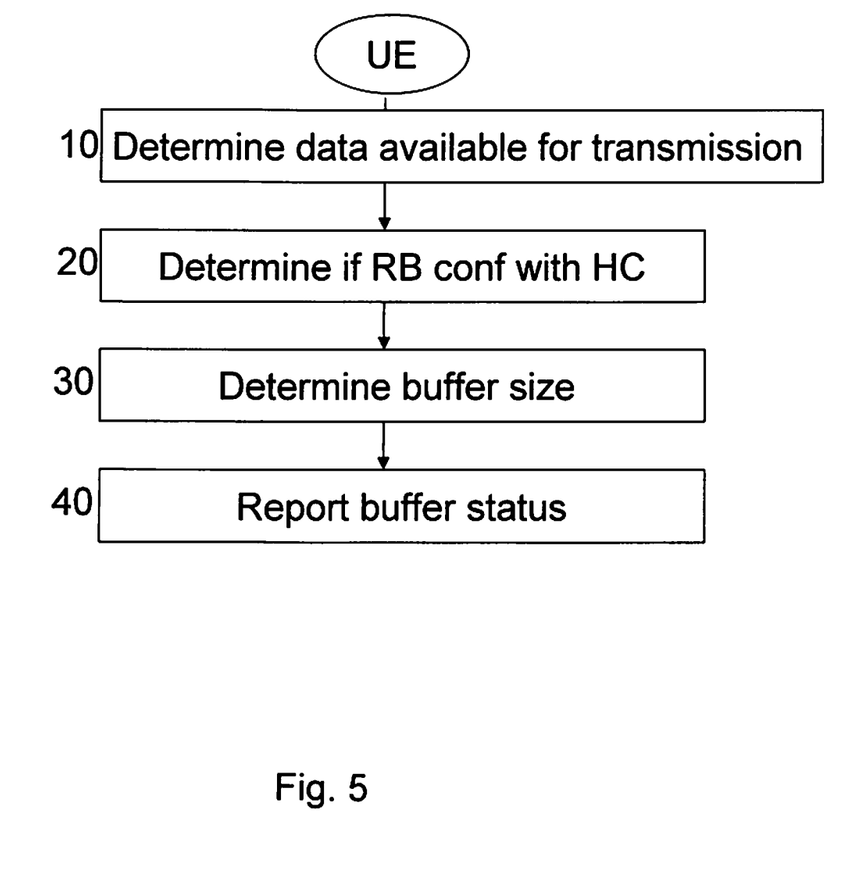
FIG. 5 is a flowchart of the method for a UE according to an embodiment of the present invention.

The FIG. 5 illustrates a flowchart of the method according to a first embodiment of the present invention. The UE 100 (as illustrated in FIG. 4) comprises a data buffer associated with a radio bearer. The UE 100 determines 10 data available for transmission in the data buffer to be transmitted to the eNodeB 200. The UE 100 further determines a configuration 20 of the radio bearer, e.g. if the radio bearer is configured with header compression or not. In the next step, the UE 100 determines a buffers size 30, which is based on the data available for transmission and t he configuration of the radio bearer. When the UE 100 sends a report of the buffer status 40 to the eNodeB, the buffer size is included in the buffer status report. In the following description different alternatives on how to determine the buffer size based on the data available for transmission and the configuration of the radio bearer are described.

When the radio bearer is not configured with header compression the buffer size is determined to be a size of the data available for transmission. For example, if data in the buffer is data A, B, C, D and E the buffer size in the buffer status report is the size of data A, B, C, D and E. However, when the radio bearer is configured with header compression the data buffer could comprise both uncompressed data and compressed data. For example, data in the data buffer is data a, b, c, D and E, where a, b and c denotes a compressed data A, B, and C respectively, and D and E denotes an uncompressed data D and E, respectively.

As a first alternative, the buffer size could then be determined to be a size of the compressed data in the data buffer. Consequently, the buffer size in the buffer status report is the size of the compressed data a, b and c. A typical scenario wherein the first alternative is utilized is when the radio bearer is configured with RLC-UM. Typically, the RLC-UM is used for real-time services that often exchange packets with small payloads transmitted at fixed intervals, e.g. VoIP services, for which services network capacity and efficient usage of radio resources is important. An advantage is that the error of the buffer status report, which would have been introduced by reporting uncompress data when the header is almost as large as the payload itself, has been removed. Thus, the eNodeB receives more precise information on the state of the UE buffer and can more efficiently manage radio resources in conjunction with the knowledge of the behaviour of the service.

As a second alternative, the buffer size could be determined to be a size of the compressed data and the uncompressed data in the data buffer. In the previous example this would imply that the buffer size in the buffer status report is the size of the compressed data a, b and c and the uncompressed data D and E.

As a third alternative, the buffer size could be determined to be a size of the uncompressed data and an uncompressed version of the compressed data in the data buffer. Accordingly, the buffer size in the buffer status report is the size of the uncompressed data A, B and C and the uncompressed data D and E. A typical scenario wherein the third alternative is utilized is when the radio bearer is configured with RLC-AM. Typically, RLC-AM is used for best-effort services that often exchange larger volume of data, e.g. TCP data transfers, for which services the network will allocate radio resources to provide an acceptable data rate over the air without either starving the UE due to under-allocation of resources or having the UE transmit padding due to over-allocation of resources. The overhead of the header compared to the payload is relatively small for RLC-AM, TCP and large packets. Thus, an advantage is that the eNodeB receives information from which it can deduce a bit rate or a packet rate, based on the knowledge of the traffic characteristics, e.g. packet size.

Figure 6:
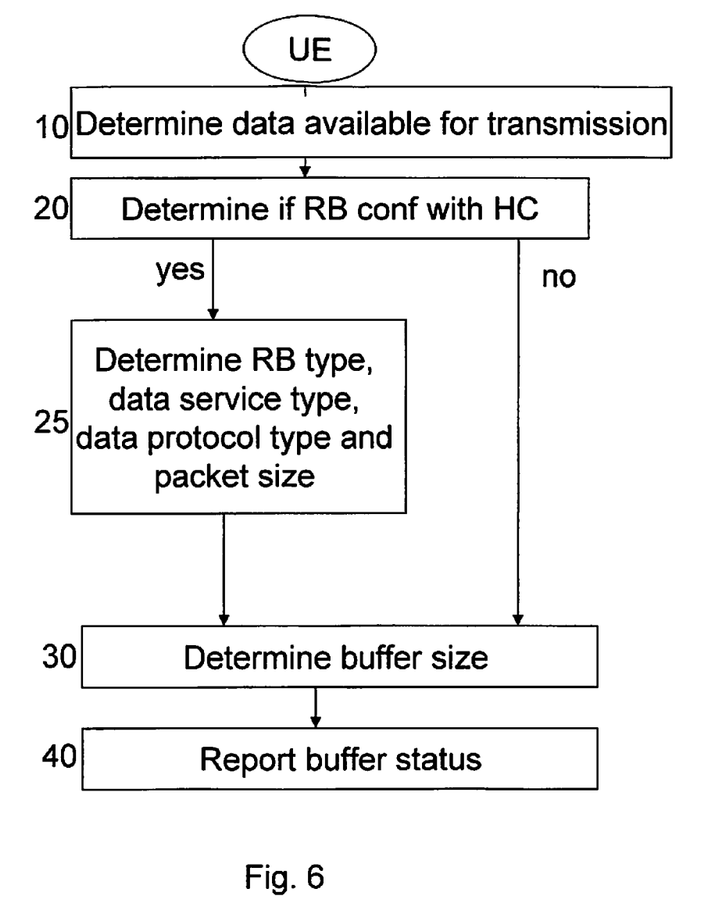
FIG. 6 is a flowchart of the method for a UE according to another embodiment of the present invention.

In another embodiment of the present invention illustrated in FIG. 6, when header compression is configured on the radio bearer the buffer size is based on the data available for transmission and characteristics of the radio bearer and/or characteristics of the data available for transmission in the data buffer. The UE additionally determines 25 a radio bearer type and/or a data service type of the data available for transmission and/or a data protocol type of the data available for transmission and/or a packet size of the data available for transmission. Moreover, the buffer size is based on the radio bearer type and/or the data service type of the data available for transmission and/or the data protocol type of the data available for transmission and/or the packet size of the data available for transmission. The buffer size comprised in the buffer status report is determined in accordance with the previously described first, second and third alternatives.

In a scenario of an embodiment of the present invention, the radio bearer is determined to be configured with header compression and the radio bearer type is a radio bearer configured with RLC-AM. In this scenario, the buffer size could typically be determined to be the size of the uncompressed data and an uncompressed version of the compressed data in the data buffer. If the data in the data buffer is a, b, c, D and E, the buffer size in the buffer status report is the size of the uncompressed data A, B and C and the uncompressed data D and E. However, it should be noted that the other alternatives of determining the buffer size, i.e. the first and second alternatives, could also be applicable in the described scenario.

In yet another scenario of an embodiment of the present invention, the radio bearer is determined to be configured with header compression and the radio bearer type is a radio bearer configured with RLC-UM. In this scenario, the buffer size could typically be determined to be the size of the compressed data in the data buffer. If the data in the data buffer is a, b, c, D and E, the buffer size in the buffer status report is the size of the compressed data a, b and c. However, it should be noted that the other alternatives of determining the buffer size, i.e. the second and third alternatives, could also be applicable in the described scenario.

In yet another scenario of an embodiment of the present invention, the radio bearer is determined to be configured with header compression and the data protocol type is TCP. In this scenario, the buffer size could typically be determined to be a size of the uncompressed data and the uncompressed version of the compressed data in the data buffer. If the data in the data buffer is a, b, and c and D and E, the buffer size in the buffer status report is the size of the uncompressed data A, B and C and the uncompressed data D and E. An advantage is that the eNodeB receives information from which it can deduce a bit rate or a packet rate, based on the knowledge of the traffic characteristics, e.g. packet size. Further, if the data protocol type is determined to be RTP (Real Time Protocol) the buffer size could typically be determined to be a size of the compressed data in the data buffer. If the data in the data buffer is a, b, c, D and E, the buffer size in the buffer status report is the size of the compressed data a, b and c. An advantage is that the eNodeB receives more precise information on the state of the UE buffer and can more efficiently manage radio resources in conjunction with the knowledge of the behaviour of the service.

In yet another scenario of an embodiment of the present invention, the radio bearer is determined to be configured with header compression and the packet size of the data available for transmission in the data buffer is determined to be larger than a predetermined threshold value. In this scenario, the buffer size could typically be determined to be a size of the uncompressed data and the uncompressed version of the compressed data in the data buffer. If the data in the data buffer is a, b, c, D and E, the buffer size in the buffer status report is the size of the uncompressed data A, B and C and the uncompressed data D and E. However, if the packet size is determined to be equal or smaller than the predetermined threshold value, the buffer size could typically be determined to be a size of the compressed data in the data buffer. If the data in the data buffer is a, b, c, D and E, the buffer size in the buffer status report is the size of the compressed data a, b and c.

In yet another scenario of an embodiment of the present invention, the radio bearer is determined to be configured with header compression and the data service type of the data available for transmission in the data buffer is determined to be a best-effort type of data service such as file transfers or web browsing using e.g. TCP. In this scenario, the buffer size could typically be determined to be a size of the uncompressed data and the uncompressed version of the compressed data in the data buffer. If the data in the data buffer is a, b, c, D and E, the buffer size in the buffer status report is the size of the uncompressed data A, B and C and the uncompressed data D and E. However, if the data service type is determined to be a real-time type of data service such as a VoIP service or gaming service the buffer size could typically be determined to be a size of the compressed data in the data buffer. If the data in the data buffer is a, b, c, D and E, the buffer size in the buffer status report is the size of the compressed data a, b and c.

Figure 7:
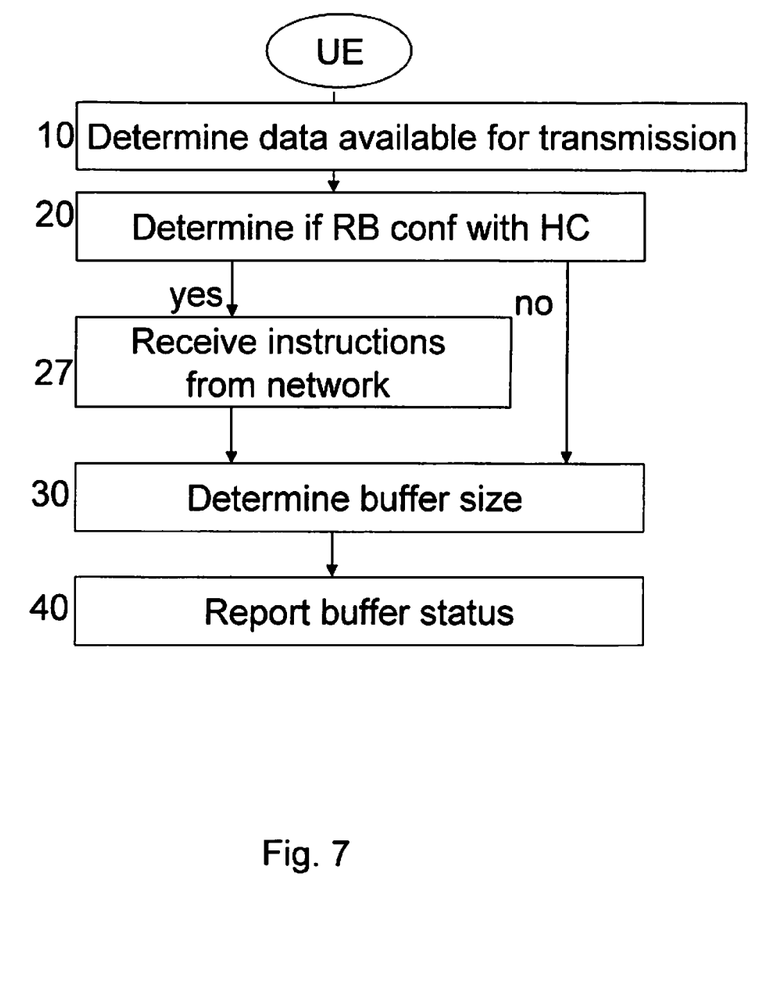
FIG. 7 is a flowchart of the method for a UE according to yet another embodiment of the present invention.

FIG. 7 illustrates an embodiment of the present invention, wherein the UE receives instructions 27 on how to determine the buffer size from the eNodeB. The instruction could be to use any one of the three alternatives of determining the buffer size to be comprised in the buffer status report. Furthermore, the determining of the buffer size could be preconfigured in the wireless communication system. The instructions and the preconfiguration could be defined per radio bearer, per group of radio bearers or for all the radio bearers utilized by the UE.

Figure 8:
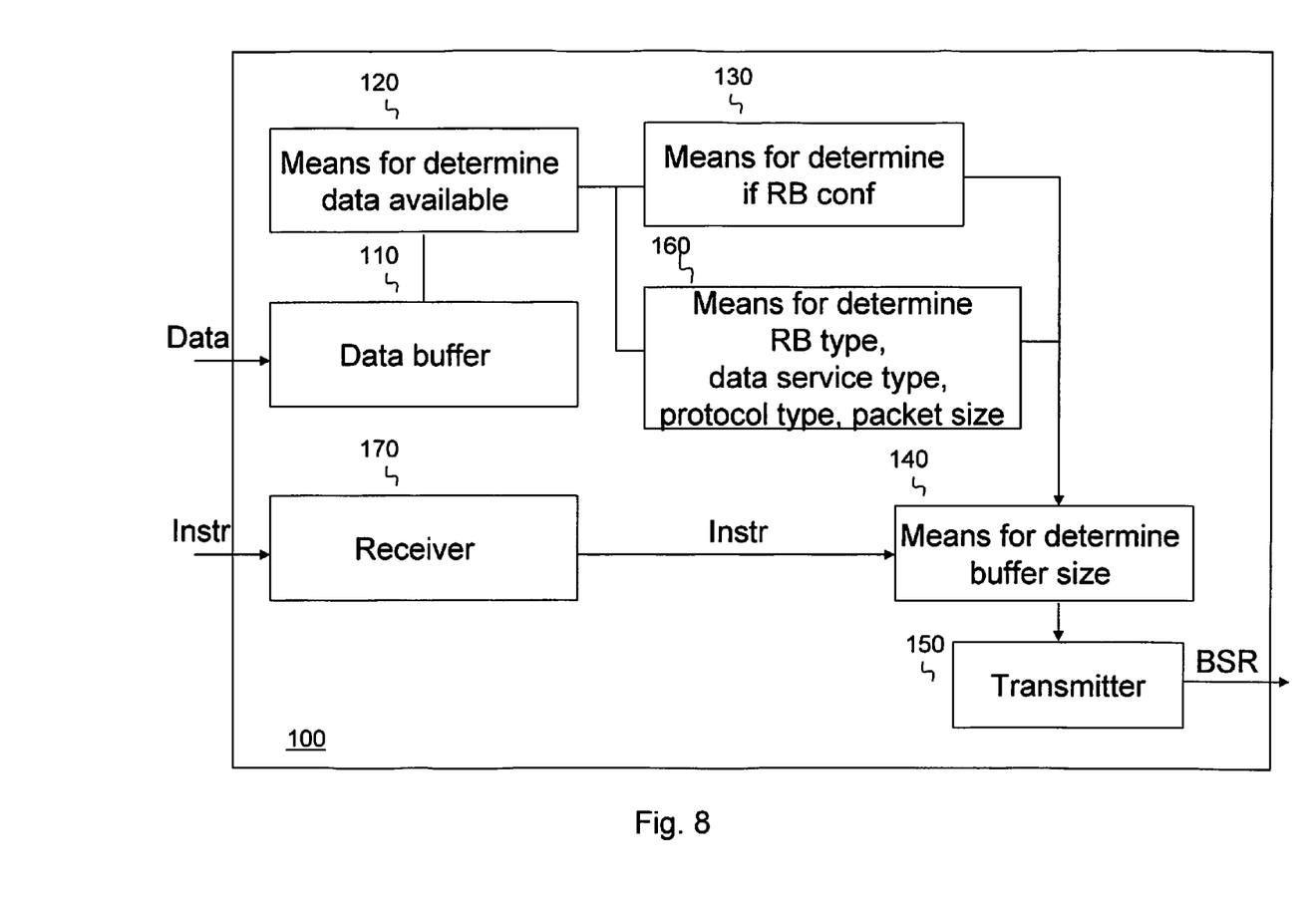
FIG. 8 illustrates schematically a block diagram of the UE according to an embodiment of the present invention.

Turning now to FIG. 8 illustrating the means to be implemented in the UE according to one embodiment of the present invention.

The UE 100 is adapted for reporting the buffer status to a network node, i.e. eNodeB 200 as illustrated in FIG. 4. The UE comprises a data buffer 110 associated with a radio bearer. Further, the UE comprises means for determining data 120 available for transmission in the data buffer to be transmitted to the network node and means for determining a configuration 130 of the radio bearer. In addition, the UE comprises means for determining a buffer size 140 based on at least one of the data available for transmission in the data buffer and the determined configuration of the radio bearer. The UE further comprises a transmitter 150 for reporting the buffer status comprising the buffer size to the network node. In an embodiment of the present invention the UE comprises means for determining 160 at least one of a radio bearer type, a data service type, a data protocol type and a packet size. In another embodiment of the present invention the UE comprises a receiver 170 for receiving instructions on how to determine buffer size from the network node.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method in a user equipment of a wireless communication system for reporting a buffer status to a network node of the wireless communication system, the user equipment having a data buffer associated with a radio bearer, the method comprising the steps of:
   determining by the user equipment, data available for transmission in the data buffer to be transmitted to the network node;
   determining by the user equipment, whether the radio bearer is configured with header compression;
   determining by the user equipment, content of a buffer status report based at least on the data available for transmission and the determination of whether the radio bearer is configured with header compression, wherein;
      in response to a determination that the radio bearer is not configured with header compression, the user equipment determines a buffer size equal to the data available for transmission; and
      in response to a determination that the radio bearer configured with header compression, the user equipment determines a buffer size equal to a size of any compressed data in the data buffer, a size of any compressed data in the data buffer plus uncompressed data in the data buffer, or a size of any compressed data in the data buffer plus an uncompressed version of the compressed data in the data buffer; and
   reporting by the user equipment, the buffer status comprising the buffer size to the network node.

2. The method according claim 1, further comprising:
   determining by the user equipment, at least one of a radio bearer type, a data service type, a data protocol type, and a packet size; and
   wherein in addition to the data available for transmission and the determination of whether the radio bearer is configured with header compression, the user equipment determines the buffer size based on at least one of the determined radio bearer type, the data service type, the data protocol type, and the packet size.

3. The method according to claim 2, wherein the radio bearer type is a radio bearer configured with Radio Link Control-Acknowledged Mode (RLC-AM), and the user equipment determines the buffer size to be the size of the compressed data in the data buffer plus an uncompressed version of the compressed data in the data buffer.

4. The method according to claim 2, wherein the data protocol type is Real-time Transport Protocol (RTP) and the user equipment determines the buffer size to be the size of the compressed data in the data buffer.

5. The method according to claim 3, wherein the data protocol type is Transmission Control Protocol (TCP).

6. The method according to claim 2, wherein the packet size is larger than a predetermined value, and the user equipment determines the buffer size to be the size of the compressed data in the data buffer plus an uncompressed version of the compressed data in the data buffer.

7. The method according to claim 2, wherein the packet size is smaller or equal to a predetermined value, and the user equipment determines the buffer size to be the size of the compressed data in the data buffer.

8. The method according to claim 2, wherein the data service type is a best-effort service type, and the user equipment determines the buffer size to be the size of the compressed data in the data buffer plus an uncompressed version of the compressed data in the data buffer.

9. The method according to claim 2, wherein the data service type is a real-time service type. and the user equipment determines the buffer size to be the size of the compressed data in the data buffer.

10. A user equipment for reporting a buffer status to a network node, the user equipment and the network node being in a wireless communication system, the user equipment having a data buffer associated with a radio bearer, the user equipment comprising:
    means for determining data available for transmission in the data buffer to be transmitted to the network node;
    means for determining whether the radio bearer is configured with header compression;
    means for determining content of a buffer status report based at least on the data available for transmission and the determination of whether the radio bearer is configured with header compression, wherein;
       in response to a determination that the radio bearer is not configured with header compression, the user equipment is configured to determine a buffer size equal to the data available for transmission; and
       in response to a determination that the radio bearer is configured with header compression, the user equipment is configured to determine a buffer size equal to a size of any compressed data in the data buffer, a size of any compressed data in the data buffer plus uncompressed data in the data buffer, or a size of any compressed data in the data buffer plus an uncompressed version of the compressed data in the data buffer; and
    a transmitter for reporting the buffer status comprising the buffer size to the network node.

11. The user equipment claim 10, further comprising:
    means for determining at least one of a radio bearer type, a data service type, a data protocol type, and a packet size; and
    wherein in addition to the data available for transmission and the determination of whether the radio bearer is configured with header compression, the user equipment is also configured to determine the buffer size based on at least one of the determined radio bearer type, the data service type, the data protocol type, and the packet size.

12. The user equipment of 11, wherein the radio bearer type is a radio bearer configured with Radio Link Control-Acknowledged Mode RLC-AM and the user equipment determines the buffer size to be the size of the compressed data in the data buffer plus an uncompressed version of the compressed data in the data buffer.

13. The user equipment of claim 10, wherein the data protocol type is Real-time Transport Protocol (RTP), and the user equipment is configured to determine the buffer size to be the size of the compressed data in the data buffer.

14. The user equipment of claim 12, wherein the data protocol type is Transmission Control Protocol (TCP).

15. The user equipment of claim 11, wherein the packet size is larger than a predetermined value, and the user equipment is configured to determine the buffer size to be the size of the compressed data in the data buffer plus an uncompressed version of the compressed data in the data buffer.

16. The user equipment of claim 11, wherein the packet size is smaller or equal to a predetermined value, and the user equipment is configured to determine the buffer size to be the size of the compressed data in the data buffer.

17. The user equipment of claim 11, wherein the data service type is a best-effort service type, and the user equipment is configured to determine the buffer size to be the size of the compressed data in the data buffer plus an uncompressed version of the compressed data in the data buffer.

18. The user equipment of claim 11, wherein the data service type is a real-time service type, and the user equipment is configured to determine the buffer size to be the size of the compressed data in the data buffer.

19. The method according to claim 2, wherein the radio bearer type is a radio bearer configured with Radio Link Control-Unacknowledged Mode (RLC-UM) and the user equipment determines the buffer size to be the size of the compressed data in the data buffer.

20. The user equipment of claim 11, wherein the radio bearer type is a radio bearer configured with Radio Link Control-Unacknowledged Mode (RLC-UM) and the user equipment is configured to determine the buffer size to be the size of the compressed data in the data buffer.

* * * * *